Figure 1:
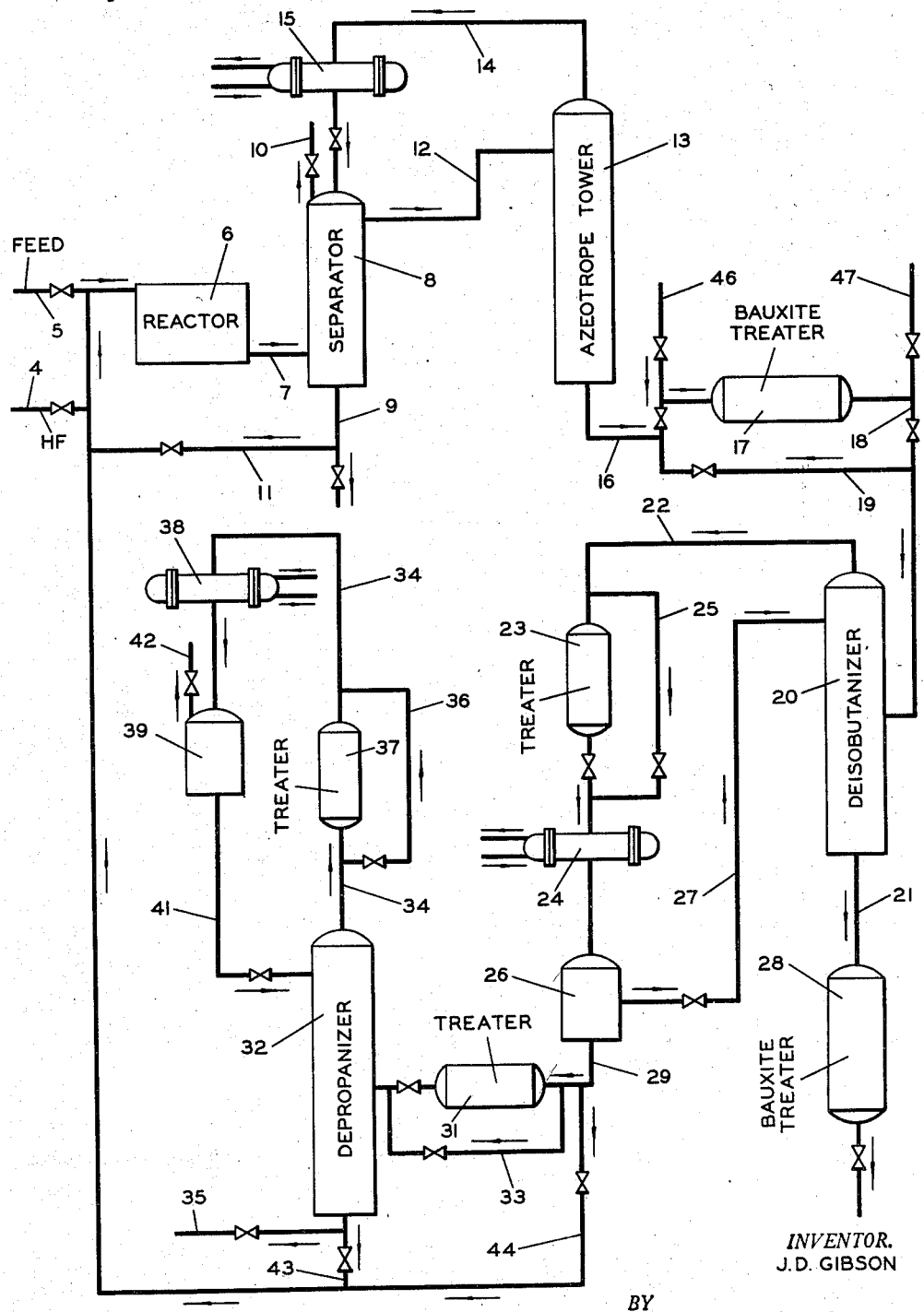

April 24, 1951   J. D. GIBSON   2,550,343
REMOVAL OF SILICON TETRAFLUORIDE FROM HYDROCARBONS
Filed April 22, 1946   2 Sheets-Sheet 2

INVENTOR.
J. D. GIBSON
BY
ATTORNEYS

Patented Apr. 24, 1951

2,550,343

UNITED STATES PATENT OFFICE 2,550,343

REMOVAL OF SILICON TETRAFLUORIDE FROM HYDROCARBONS

James D. Gibson, Bartlesville, Okla., assignor to Phillips Petroleum Company, a corporation of Delaware Application April 22, 1946, Serial No. 663,829, 7 Claims. (Cl. 260—683.4)

This invention relates to the removal of silicon tetrafluoride from hydrocarbons. In one particular embodiment this invention relates to the prevention of siliceous deposits which may accumulate in condensers used in the fractionation of hydrocarbons. In one particular aspect this invention relates to the removal of fluorine compounds, such as hydrogen fluoride and silicon tetrafluoride, from a hydrocarbon stream in which the fluorine compounds are present as impurities formed in a process for the conversion of hydrocarbons in the presence of fluorine-containing catalysts.

In the manufacture of hydrocarbons by processes in which fluorine-containing catalysts are used, small proportions of organic fluorine-containing by-products are formed. These processes may involve reactions such as polymerization, isomerization, disproportionation and alkylation of relatively low-boiling hydrocarbons to produce motor-fuels of high octane quality and are effected in the presence of catalysts comprising one or more of such fluorine compounds as hydrofluoric acid, boron trifluoride, or the like. Although the exact nature or composition of the organic fluorine-containing by-products which may be formed has not been definitely established, they are believed to be predominantly alkyl and/or aryl fluorides. These fluorides are not completely removed by washing the hydrocarbons with alkali solutions, such as aqueous solutions of sodium hydroxide or sodium carbonate. The fluorides tend to decompose at elevated temperatures, such as those employed in fractional distillation of the hydrocarbons, thereby forming hydrofluoric acid, which is corrosive, especially in the presence of moisture. In gases, they may thus cause corrosion of handling equipment; in liquid motor-fuel hydrocarbons, they are undesirable for reasons that are obvious.

As discussed in Frey Patent 2,347,945, issued May 2, 1944, such organic fluorine compounds may be removed from hydrocarbon materials containing them by contacting such a hydrocarbon material with any one of a number of solid porous contact materials. Contact materials which have been found suitable include alumina gel, activated alumina, dehydrated bauxite, chromium oxide, mixtures of alumina and chromium oxide, chromium ores comprising chromium oxide and ores of related materials such as those containing zirconia, limestone, magnesia, and the like. Such contact materials appear to adsorb preferentially the organic fluorine compounds although the exact mechanism involved is not known at present. Materials which contain large quantities of silicon dioxide or of various naturally occurring silicates are generally not suitable for such treatment, but many of the naturally occurring ores which can be so used contain appreciable amounts of silica or silicates. One such material which has found wide commercial use is hard granular bauxite. Such bauxite has a variable composition, which may be exemplified by the following typical analysis, in per cent by weight:

| Substance | Per cent |
|---|---|
| $Al_2O_3$ | 77.5 |
| $SiO_2$ | 9.4 |
| $TiO_2$ | 3.4 |
| $Fe_2O_3$ | 6.0 |
| $H_2O$ | 1.7 |
| V. M. | 2.0 |
| Total | 100.0 |

The presence of silica is undesirable because it causes the formation of silicon tetrafluoride. Nevertheless, in practice bauxite containing up to 15 and even 20 per cent of silica has been used, in the absence of any alternative readily available and economical material. When the bauxite has become partially spent for such use and/or when the hydrocarbon material being treated is passed through the mass of contact agent at a high flow rate, it has been found that silicon tetrafluoride is present in the effluent; also, some water, which appears to be formed by reaction of the fluorine compounds with the bauxite, is present in the effluents. That is, after conversion of the hydrocarbons, either in the liquid or vapor phase, in the presence of fluorine-containing catalysts, such as hydrogen fluoride, boron trifluoride and the complexes of the same with other compounds, silicon tetrafluoride is formed when the hydrocarbon conversion effluent is contacted with contact materials containing minor proportions of silica. Thus, the conversion effluent after removal of the organic fluorine compounds comprises the conversion product, various lower-boiling by-products formed during conversion, and the relatively low-boiling silicon tetrafluoride and water.

It is necessary, in most cases, to remove the organic fluorine compounds by contacting the hydrocarbon effluent with a suitable contact material; but as a result of this treatment silicon tetrafluoride and water are liberated by the reaction of hydrogen fluoride or the organic fluorine compounds with silica present as an impurity in the contact material. Typical equations of reactions which may occur in the treatment of the effluent with bauxite are:

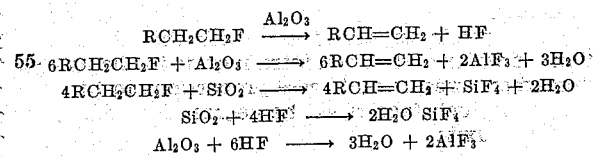

Although bauxite has been referred to in particular, any type of contact material suitable for the sorption of organic fluorine compounds in which minor proportions of silica are present are within the scope of this invention.

After being formed, the silicon tetrafluoride and the water are conveyed along with the hydrocarbon effluent from the contact material to subsequent treating equipment, which is usually fractionating equipment, for the separation and purification of the conversion product. The silicon tetrafluoride and water accumulate in the overhead fractions from the various fractionators, since they comprise some of the low-boiling components of the hydrocarbon effluent. In consequence, trouble is experienced in the subsequent treating equipment as a result of the silicon tetrafluoride reacting with water to form various solid siliceous deposits. When the effluent of the bauxite treating step just discussed is in the liquid phase, and the proportions of silicon tetrafluoride and water are so small that these materials are completely dissolved, relatively little or only minor trouble may be experienced, if any. However, when much of the heavier hydrocarbon materials have been removed by fractional distillation so that the concentrations of the silicon tetrafluoride and the water are increased, and especially when the temperature is so low that free liquid water separates from the hydrocarbon mixture, the silicon tetrafluoride reacts with the water, forming siliceous deposits that accumulate, thereby partially or completely plugging equipment and necessitating an expensive shutdown and interruption of production in order to remove the siliceous deposits. Sometimes the deposits form in the condenser of the first fractionator, such as the deisobutanizer; sometimes the deposits may not form until the effluent has reached the condenser of the second fractionator, such as a depropanizer; sometimes the deposits form in the condensers of all the fractionators.

The following equations are illustrative of reactions involved in the hydrolysis of silicon tetrafluoride:

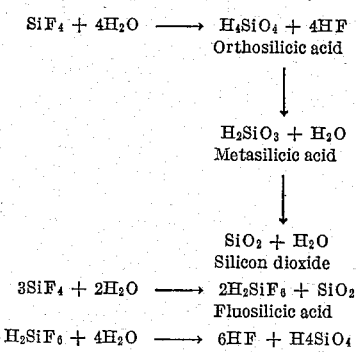

The formation of orthosilicic acid results in a gel-type deposit which tends to accumulate and plug the condenser tubing and reflux pipes and valves. Under appropriate conditions orthosilicic acid decomposes to metasilicic acid or silicon dioxide, which are solid precipitates and which also obstruct the passage of hydrocarbons through the condensers and tubings of the fractionating equipment.

The deposits appear to vary with the proportions of water and silicon tetrafluoride in the hydrocarbon stream; and these proportions in turn vary with such factors as the degree of spending of the bauxite.

The amount of organic fluorine present in the charge to the treating step for the removal of fluorine compounds generally is not more than about 0.1 per cent by weight and often is not more than 0.001 to 0.05 per cent by weight. Most of this organic fluorine is retained by the treating agent, and the silicon tetrafluoride in the effluent from this treating step generally is less than about 0.01 per cent by weight, and often is less than 0.005 per cent by weight. Nevertheless, in commercial plants, wherein several hundred barrels of hydrocarbons are treated per day and the silicon tetrafluoride reacts with water to form solid siliceous deposits in certain specific locations, such as the condenser and accumulator of a deisobutanizer or a depropanizer, the amount of solid siliceous material accumulated over a period of a few weeks or a few months amounts to a very substantial amount.

The object of this invention is to remove organically combined fluorine from a hydrocarbon fluid containing the same.

An object of the present invention is to provide a process for preventing the formation of siliceous deposits in condensers of fractionating equipment used for the separation of the product of a hydrocarbon conversion process.

It is also an object to prevent the plugging of condensers and tubing wherein siliceous deposits are accumulated as the result of the presence of silicon tetrafluoride in the condensate.

Another object is to prevent the corrosion of fractionating equipment caused by the liberation of acids in the condensers and tubing of the fractionating equipment.

A still further object is to remove inorganic fluorine compounds from a hydrocarbon conversion effluent from an alkylation process using a fluorine-containing alkylation catalyst.

A further object is to produce a high quality motor fuel substantially free from undesirable fluorine impurities.

Other objects and advantages will appear obvious to those skilled in the art from the accompanying disclosure and description.

According to this invention, the formation of siliceous deposits in condensers, accumulators, reflux pipes, etc. of fractionating equipment of hydrocarbon conversion processes using a fluorine-containing catalyst is prevented or minimized by removing silicon tetrafluoride from the hydrocarbon stream passing to the aforesaid fractionating equipment. Unexpectedly, it has been found that fluorine compounds, including silicon tetrafluoride, are removed from hydrocarbon materials containing the same by contacting the hydrocarbon materials with an oxide of iron. In the application of this invention to an alkylation process using the fluorine-containing catalyst, the hydrocarbon effluent from the treater for the removal of the organic fluorine compounds is contacted with an oxide of iron at a suitable location at or between the treater and the place where siliceous deposits have been found to occur.

Of the various oxides of iron, ferric oxide is preferred; however, ferrous oxide and mixtures of the various iron oxides may be used as the silicon tetrafluoride-removing material without departing from the scope of this invention. Ferric oxide is readily available as a natural material in the form of hematite and limonite and as a waste material in the form of iron rust and cinders from pyrite burners. Ferric oxide from such sources is relatively inexpensive. When the ferric oxide contains moisture or water of hydration it is preferably dehydrated before use in order to render the ferric oxide contact material substantially free from moisture.

The hydrocarbon material to be freed of the silicon tetrafluoride and any other fluorine compound is passed over the iron oxide in the closed chamber at a space velocity of about 1 to about 10 volumes of liquid per volume of iron oxide per hour and at a temperature between about 50 and about 550° F. Preferably the pressure during the contact process is maintained sufficiently high to ensure contact in the liquid phase since, as a general rule when operating in the liquid phase, the temperature of the hydrocarbon stream will be lower than when operating in the vapor phase. A lower temperature of contact enables a higher efficiency of silicon tetrafluoride removal by the iron oxide. It is preferred to maintain the temperature of the hydrocarbon stream contacting the iron oxide below about 250° F. to obtain optimum removal of silicon tetrafluoride. Although liquid phase operation of the contact treatment with iron oxide is preferable, vapor phase operation of the contact operation is within the scope of this invention.

Normally, in the treatment of hydrocarbon conversion effluents with bauxite containing a minor proportion of silica to remove the undesired organic fluorine compounds, besides silicon tetrafluoride being formed by the contact with the bauxite some hydrogen fluoride is also formed as previously indicated. Thus, the effluent stream from the bauxite contact operation may contain not only silicon tetrafluoride but relatively small amounts of unremoved organically combined fluorine and hydrogen fluoride as impurities. During contact with the iron oxide, not only is the silicon tetrafluoride removed but also these other impurities, such as organically combined fluorine and hydrogen fluoride.

As indicated by the specimen analysis previously given, many bauxites contain iron oxide. The iron oxide content is sometimes considerably higher than that shown. Unfortunately, however, this iron oxide does not effectively remove the silicon tetrafluoride formed during contact with organic fluorine-containing materials. Although the reason for this nonremoval is not completely understood, it is possible that the iron oxide may exist in solid solution with the bauxite and thus may be present in such a degree of dilution as to be ineffective in removing silicon tetrafluoride. Regardless of any postulated explanation, however, it has been experimentally demonstrated that, even when relatively highly ferriferous bauxite is used to remove organic fluorine compounds from hydrocarbon effluents from fluoride-catalyzed conversions, the previously described operational difficulties due to silicon fluoride formation are observed.

In a preferred embodiment of the present invention an organic mixture containing organic fluorine compounds is passed in either the liquid or vapor phase to a treating zone filled with a powdered or granular defluorination material and an oxide of iron. The contents of the treating zone are usually arranged in such a manner that the contact material for removal of organic fluorine compounds and the iron oxide are in alternate layers. By such an arrangement the first layer of contact material removes the organically combined fluorine with the liberation of silicon tetrafluoride and the subsequent layer of iron oxide removes the silicon tetrafluoride, etc., and the process is repeated in the next successive layers. The iron oxide may be mixed with a suitable supporting or carrier material, which permits the ready passage of gases or liquids and serves to expose the iron oxide to the fluid stream. Replaceable trays separately containing contact material and iron oxide may be placed in the contact chamber in alternate layers. When the iron oxide or the contact material becomes spent, the tray may be removed and either a new tray of fresh material inserted therein or the material in the tray may be revivified. Preferably the alternate layers of organic fluorine-removing material and iron oxide in a treating column are supported in such manner that free space exists between the supported layers. This arrangement is especially desirable since the tendency for channeling of the liquid hydrocarbon stream through the contact material is minimized. The number of layers of the zone which will be suitable for removal of the organic fluorine compound depends upon several factors such as the type of organic fluorine removing material, the conditions of temperature and pressure and the depth of the contact bed; such conditions and the number of successive layers or zones may be easily determined by trial. In general, layers from about 3 to about 6 inches in depth of organic fluorine-removing material and of iron oxide, respectively, will be sufficient when a total of about 10 to about 25 layers are used in the treating zone.

Another embodiment, which may also be practiced, is the arrangement of the organic fluorine-removing material and the iron oxide in successive zones rather than in a single zone; thus the contact material will be maintained in one separate zone or column and the iron oxide will be maintained in a second and successive zone or column.

In still another embodiment of the present invention the organic fluorine-removing material and iron oxide may be admixed in a treating zone in a substantially uniform manner and the organic mixture contacted with the uniform mixture of organic fluorine-removing material and iron oxide. The arrangement of alternate layers or separate zones for each contact material is preferred in order to facilitate the removal of the silicon tetrafluoride and to prevent consumption of the iron oxide by organically combined fluorine.

More often, however, in the alkylation of low-boiling hydrocarbons the iron oxide is used alone as a separate treating step either immediately after the organic fluorine-removing step or on the overhead from the various fractionators or on the feed to the various fractionators. When a separate silicon tetrafluoride removing step is used, iron oxide chambers are placed on the isobutanizer overhead, or on the feed to the depropanizer, or even on the depropanizer overhead. Any one of these places of treatment alone may be sufficient in order to prevent the precipitation of siliceous deposits, but in some cases it may be necessary to place treaters as suggested in all the locations. In many instances it may be necessary or desirable to remove organically combined fluorine from the bottom fraction from the deisobutanizer. Very often, therefore, a treating chamber containing organically combined fluorine-removing material and iron oxide is placed on the bottom discharge line from the deisobutanizer.

Obviously, various locations may become apparent to those skilled in the art for placing either the combination organic fluorine and the silicon tetrafluoride-removing step or solely the silicon tetrafluoride-removing step. The removal of organically combined fluorine may be conducted under similar operating conditions as those for the removal of silicon tetrafluoride; thus where the two contact materials are mixed similar conditions may be used. Where the organic fluorine-removing material and the iron oxide are in separate zones or columns somewhat different conditions of temperature and pressure etc. may be used for each column. However, due to economic considerations in most instances it is desirable to maintain substantially the same conditions in both the organic fluorine-removal zone and in the silicon tetrafluoride-removal zone.

Revivification of the organic fluorine-removing material and the iron oxide is accomplished under approximately the same conditions. The contact material and the iron oxide are revivified by passing superheated steam at a temperature from about 400 to about 800° F., preferably from about 500 to about 600° F. and at approximately atmospheric pressure through or in contact with the various contact materials. For economic reasons, the spent contact material and iron oxide are usually disposed of as waste and fresh material is used in their place without a revivification process.

Although the iron oxide contact operation can be applied with advantage in many modifications to the removal of silicon tetrafluoride and in some cases to the removal of organically combined fluorine and hydrogen fluoride, particular benefits of it have been realized in connection with the removal of silicon tetrafluoride from a conversion effluent from the alkylation of an alkylatable hydrocarbon with an olefin in the presence of a fluorine-containing alkylation catalyst.

It is believed that the principles of this invention may be adequately illustrated by the discussion of a specific embodiment in connection with the accompanying drawings which form a part of this application and which illustrate diagrammatically an arrangement of apparatus suitable for practicing this invention in connection with an alkylation process.

Figure 1 illustrates an arrangement of apparatus for an alkylation process in which an embodiment of this invention may be practiced.

Figure 2:
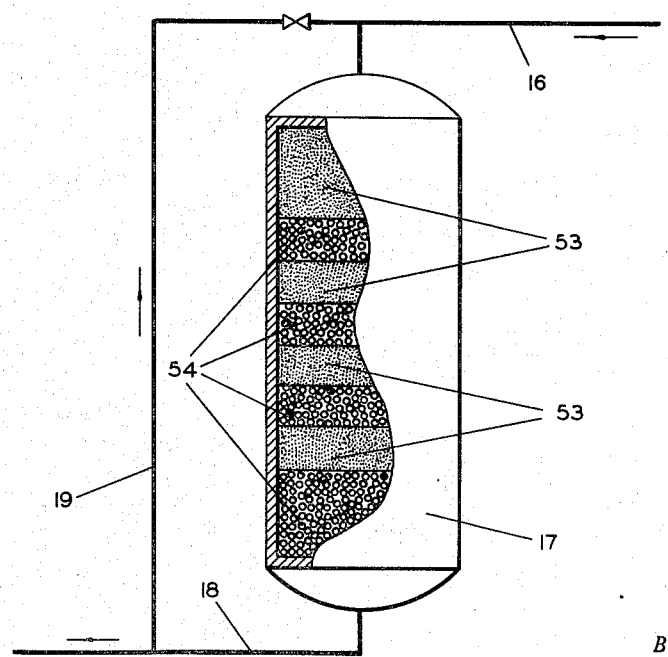

Figure 2 diagrammatically illustrates the arrangement of organic fluorine-removing material and iron oxide in contact zone 17 of Figure 1.

Figure 3:
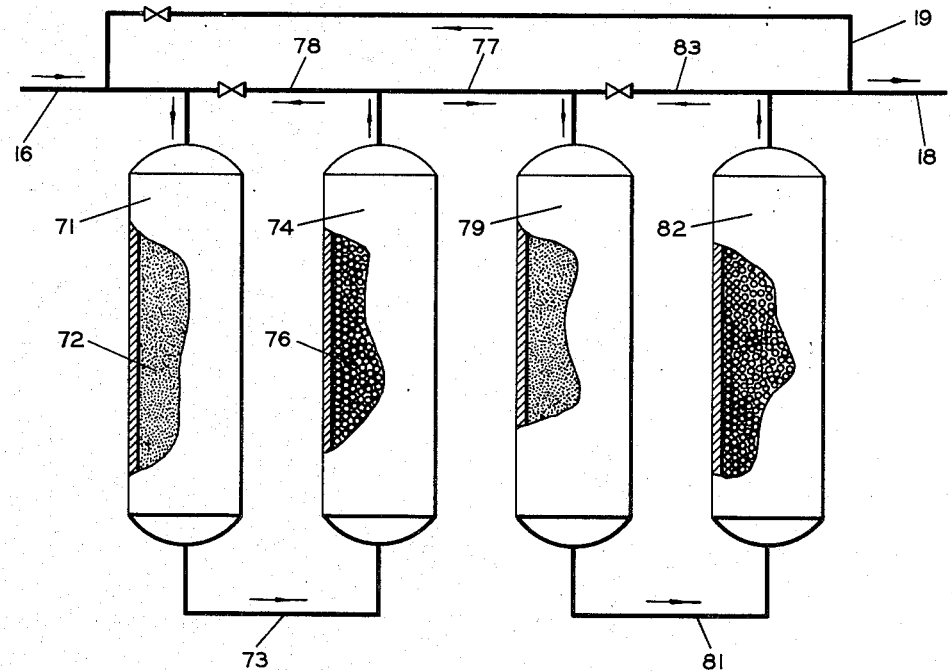

Figure 3 also illustrates another embodiment of the present invention in which the contact material and iron oxide are arranged in successive and separate zones for the removal of organically combined fluorine and silicon tetrafluoride from the hydrocarbon stream of line 16 of Figure 1.

Referring to Figure 1 of the drawings, a hydrocarbon feed comprising a mixture of low-boiling isoparaffins and low-boiling olefins enters reactor 6 through line 5. For example, typical low-boiling isoparaffins comprise isobutane, isopentane, etc., and typical low-boiling olefins comprise propylene, butenes, amylenes and hexenes. Any desired type of reaction chamber or series of chambers may be employed without departing from the scope of this invention. Hydrogen fluoride catalyst is introduced through lines 4 and 44 to reactor 6. Alkylation of hydrocarbons is accomplished under known conditions of pressure, temperature, and residence time in reactor 6. Preferably, the reaction is maintained at a temperature between about 50 and 150° F. and under sufficient pressure to maintain the reactants in the liquid phase. The mol ratio of isoparaffin to olefin should be relatively high in the reaction zone itself, usually as high as 100:1 or more. A conversion effluent from reaction zone 6 passes through line 7 into a separator 8 in which the effluent is separated into two liquid phases, namely, a hydrocarbon-rich phase and a heavier hydrogen fluoride-rich phase. The liquid hydrogen fluoride-rich phase is withdrawn from separator 8 through line 9 for purification (not shown) if desired, or the hydrogen fluoride-rich phase is recycled as a catalyst through lines 11 and 44 to reactor 6. The liquid hydrocarbon-rich phase containing some dissolved hydrogen fluoride and organically combined fluorine passes from separator 8 to an azeotrope tower 13 via line 12. Separation of a practically azeotropic minimum-boiling mixture of hydrocarbons and hydrogen fluoride is effected in tower 13 by distillation. The azeotropic mixture containing relatively low-boiling hydrocarbons and hydrogen fluoride passes as a vapor from tower 13 through line 14 and condenser 15 to separator 8. A liquid hydrocarbon stream, substantially free from hydrogen fluoride but containing organic fluorine compounds formed during the alkylation reaction, passes from the bottom of tower 13 through line 16 to a bauxite treater 17. These organic fluorine compounds, which are formed as by-products of the hydrocarbon conversion, are removed by treatment with a suitable contact material, such as dehydrated bauxite or alumina, in treater 17. When siliceous material, such as silica or various natural silicates, is present in the contact material, silicon tetrafluoride is formed and appears in the effluent from treater 17. The presence of silicon tetrafluoride in the effluent from treater 17 is especially evident when the contact material is partially spent and/or when an economically desirable high flow rate is used.

In order to prevent the presence of silicon tetrafluoride in the effluent from treater 17, treater 17 comprises, according to an embodiment of this invention, successive layers of contact material, such as dehydrated bauxite, and iron oxide or comprises a uniform mixture of a contact material and iron oxide. An arrangement of iron oxide and bauxite is shown in Figure 2 of the drawing and will be discussed more fully hereinafter. Another arrangement of the bauxite and iron oxide for treatment of the effluent stream at this point is shown in Figure 3 of the drawing and will also be discussed more fully hereinafter. In many cases it is sufficient or even desirable to remove the silicon tetrafluoride from the feed to the various fractionating units or from the overhead from the various fractionating units; therefore, treater 17 may contain only bauxite for the removal of organic fluorine compounds and not iron oxide. The removal of the silicon tetrafluoride from the hydrocarbon stream at other points in the alkylation process will be discussed hereinafter.

The effluent from bauxite treater 17 is removed therefrom through line 18 and passed to a deisobutanizer 20. A portion of the effluent from treater 17 may be recycled to treater through line 19, if desired.

Normal butane and heavier hydrocarbons are separated from isobutane and lighter hydrocarbons in deisobutanizer 20, which is a fractionating column complete with a condenser 24 and an accumulator 26. Normal butane and heavier hydrocarbons are withdrawn from deisobutanizer 20 via line 21 and, if this stream contains organically combined fluorine, it is passed through another bauxite treater 28 to remove the organically combined fluorine. As in bauxite treater 17 if silicon tetrafluoride is formed during the treatment, the silicon tetrafluoride may be removed from the resulting stream by charging bauxite treater 28 with sufficient iron oxide to remove the silicon tetrafluoride. A butane and heavier hydrocarbon stream substantially free from organically combined fluorine and silicon tetrafluoride is conveyed through line 21 to subsequent fractionators and process equipment (not shown) for separation and recovery of butane and an alkylation product; also a portion of the butane and heavier hydrocarbon stream from deisobutanizer 20 may be recycled to reactor 6 by means not shown.

The overhead product from deisobutanizer 20 comprising isobutane and lighter hydrocarbons passes therefrom through line 22 and a condenser 24 into accumulator 26. Vaporous hydrocarbons are condensed in condenser 24 and are accumulated as a liquid in accumulator 26. A portion of the hydrocarbon liquid from accumulator 26 is returned through line 27 to deisobutanizer 20 as a liquid reflux therefor. If conditions of temperature and pressure within accumulator 26 and condenser 24 are appropriate, particularly if the solubility of the water in the hydrocarbon is decreased sufficiently to form a separate liquid water phase, and if the silicon tetrafluoride has not been previously removed, siliceous deposits are formed and accumulate in condenser 24 and accumulator 26. Sometimes the siliceous deposits even accumulate in line 27 and subsequent fractionating equipment through which the hydrocarbon stream is passed. In order to prevent the formation of such siliceous deposits according to this invention when all the silicon tetrafluoride has not been previously removed, a treater 23 containing an oxide of iron is inserted in line 22, preferably before condenser 24, as shown, although the particular location of treater 23 is not considered critical to the operation of the invention as long as the silicon tetrafluoride present in the stream at this point is removed prior to hydrolysis thereof.

At least a portion, and ordinarily all, of the overhead product from the deisobutanizer 20 passes from accumulator 26 into a depropanizer 32 via line 29 for the separation of isobutane from propane and lighter hydrocarbons. Isobutane, which is incidentally dried as a result of the depropanization, is removed from the bottom of the depropanizer 32 through line 35 or is recycled by lines 43 and 44 to reactor 6 as the circumstances may require. The overhead fraction comprising propane and lighter hydrocarbons from depropanizer 32 passes to condenser 33 through line 34, and from condenser 33 condensed hydrocarbons and uncondensed vapors pass to accumulator 39. Some of the liquid condensate is returned to depropanizer 32 through line 41 as reflux therefor. Propane and other light hydrocarbons are withdrawn from accumulator 39 through line 42.

If desired, part or even all of the overhead product from deisobutanizer 20 may be recycled to reactor 6, as by passing from accumulator 26 through line 44, particularly when the proportion of propane and lighter hydrocarbons is relatively small; in such case a drier (not shown) may be provided to remove water from this recycle product.

Frequently in the operation of such alkylation processes the accumulation of siliceous deposits in the condenser or tubing of the depropanizing equipment becomes so serious as to curtail the capacity thereof. In turn, because of the resulting inefficient removal of propane and lighter gases, continuation of the operation necessitates resorting to increased venting of such gases through line 10 from separator 8 in order to maintain a pressure within the operating limit. The extra venting adversely affects the alkylation by increased hydrogen fluoride consumption and the loss of valuable isobutane and normal butane. The most serious accumulation and formation of siliceous deposits is ordinarily observed in the depropanizing equipment, wherein the conditions of temperature and pressure and water concentration are more often such as to form a separate water phase in the condenser, accumulator and even on some of the fractionating plates of the depropanizing column 32. Therefore according to a specific embodiment of this invention, when the hydrocarbon stream at this point contains silicon tetrafluoride, a treater 31 containing iron oxide is inserted in line 29 as shown. In most cases treater 31 will remove enough of the silicon tetrafluoride from the hydrocarbon stream to prevent formation of siliceous deposits in any of the accessory equipment of depropanizer 32; however in some cases it may be desirable or necessary to insert an additional treater 37 in overhead line 34 of depropanizer 32. When it is desired, therefore, the overhead line 34 passes through a treater 37 containing an oxide of iron and the effluent from the treater 37 passes to accumulator 39. Treaters 23, 31 and 37 may be used alone or in combination with each other without departing from the scope of this invention. When a treater is not being used the hydrocarbon stream may by-pass the treater through lines 25, 33 and 36.

In practice siliceous deposits often form in the fractionating tower itself. Often this formation is evident by the presence of the siliceous deposits on the top fractionating plate and by deposits in decreasing amounts on succeeding plates down the tower. By a substantially complete removal of silicon tetrafluoride from the hydrocarbon stream entering the tower the hydrolysis of silicon tetrafluoride is prevented and the accumulation of siliceous deposits in the tower eliminated. Complete removal of silicon tetrafluoride also prevents the carry-over and formation of further deposits in subsequent equipment.

In the regeneration of bauxite treater 17 with hot gases, such as steam, the gases may be introduced into treater 17 through lines 46 and withdrawn through line 47. Bauxite treater 17 may represent a group of parallel treaters so that one treater may be on regeneration while the other treater may be on process flow in order to achieve a continuous process.

Figure 2, diagrammatically representing apparatus for an embodiment of treater 17, shows alternate layers of organic fluorine-removing material and iron oxide. The hydrocarbon effluent from azeotrope tower 13 of Figure 1 enters treating unit 17 through line 16 and is removed therefrom through line 18. A portion of the resulting effluent may be recycled through treater 17 through line 19. Numeral 53 of Figure 2 designates successive layers of bauxite or other organic fluorine-removing materials and numeral 54 designates successive layers of iron oxide for removing silicon tetrafluoride and any hydrogen fluoride present.

Figure 3 diagrammatically represents another arrangement of apparatus for treating unit 17 in which the organic fluorine-removing material and iron oxide are contained in separate columns. The hydrocarbon effluent from azeotrope tower 13 of Figure 1 passes through line 16 into column 71 which contains organic fluorine-removing material, such as bauxite, designated by numeral 72. The treated hydrocarbon effluent is withdrawn from column 71 through line 73 and is introduced into a second column 74 which contains iron oxide designated by numeral 76. The iron oxide removes silicon tetrafluoride formed in column 71. The effluent from column 74 is removed by line 77 and a portion thereof may be recycled to column 71 through line 78, if desired. Effluent from column 74 is passed to column 79 which also contains an organic fluorine-removing material. The resulting effluent from column 79 is removed therefrom through line 81. This effluent from column 79 is passed to column 82 which contains iron oxide for the removal of silicon tetrafluoride formed in column 79. The effluent from column 82 is removed by line 18 and a portion thereof may be recycled to column 79 through line 83. The total effluent from the treating step is removed through line 18 and passed to deisobutanizer 20 of Figure 1. Any number of successive columns of organic fluorine-removing material and iron oxide may be used; the number of columns will depend upon the requirements necessary for removing the desired amount of organic fluorine compounds from the hydrocarbon effluent. A portion of the resulting effluent from the treating step of Figure 3 may be recycled from line 18 through 19 to line 16.

The following examples illustrate the operability of the present invention and are not considered unnecessarily limiting to the invention.

*Example I*

Normal butane containing 0.059 weight per cent silicon tetrafluoride was passed through a chamber containing rusty iron filings at about 180° F. The space velocity of the normal butane stream condition and the results of the treatment were as follows:

| Space Velocity, Liquid Vol. per Vol. of Catalyst per hour | Silicon tetrafluoride in effluent, wt. per cent | Silicon Tetrafluoride removed, per cent |
| --- | --- | --- |
| 2.2 | 0.0041 | 93 |
| 3.4 | 0.0017 | 97 |
| 7.3 | 0.0016 | 97 |
| 7.5 | 0.0019 | 97 |
| 6.8 | 0.0025 | 96 |

*Example II*

The hydrocarbon effluent from an acid settler of a hydrofluoric acid alkylation unit is passed to an azeotrope tower in which dissolved hydrofluoric acid is removed overhead as an azeotropic mixture with isobutane. The substantially acid-free liquid kettle fraction is passed through a series of two chambers, the first of which contains dehydrated bauxite and the second of which contains dehydrated limonite. The temperature and the pressure in the chambers were 180° F. and about 200 pounds per square inch gage, respectively, and the overall space velocity through the two chambers is about 2 volumes of liquid hydrocarbons per volume of bauxite and limonite per hour. Substantially complete removal of organically combined fluorine occurs in the first chamber and substantially complete removal of silicon tetrafluoride occurs in the second chamber.

The present invention may be applied in many processes in which silicon tetrafluoride is present and in which it hydrolyzes owing to the presence of water to form siliceous deposits. Although the invention has been applied specifically to hydrocarbon conversion processes, the present invention is not limited or restricted to such processes in its broadest aspects; it is also not restricted in all instances to the source of water and the silicon tetrafluoride or to the location of the particular siliceous deposits.

Having described the preferred form of the invention and having pointed out the principal considerations to be observed in its operation, and in operating of equivalent systems, it is obvious that various other changes can be made without departing from the scope of the invention.

Having described my invention, I claim:

1. In a process involving the conversion of hydrocarbons in the presence of a fluorine-containing catalyst in which a liquid hydrocarbon conversion effluent is contacted with an organic fluorine-removing material containing a minor proportion of silica and thereby is contaminated with water and with a minor amount of silicon tetrafluoride of less than 0.1 per cent by weight of said effluent, and in which components of a resulting effluent are separated by fractional distillation under conditions such that water and silicon tetrafluoride are concentrated and silicon tetrafluoride is hydrolyzed to form siliceous deposits by the condensation of a relatively low-boiling fraction from said fractional distillation, the method for preventing the formation of such siliceous deposits which comprises contacting said low-boiling fraction from which said deposits separate with an oxide of iron under conditions such that silicon tetrafluoride is removed by said iron oxide from said low-boiling fraction prior to the condensation thereof.

2. In a process involving the conversion of hydrocarbons in the presence of a fluorine-containing catalyst in which a liquid hydrocarbon conversion effluent containing organic fluorine compound is contacted with an organic fluorine-removing material containing minor proportions of silica under conditions such that the resulting effluent is contaminated with water which is present in an amount less than about 1 per cent by weight, with silicon tetrafluoride which is present in an amount less than about 0.1 per cent by weight and with a minor amount of unremoved organic fluorine compounds, the method for removing said contaminating silicon tetrafluoride and said unremoved organic fluorine compounds from the resulting effluent which comprises contacting said resulting effluent with a body of fluorine removing material comprising an organic fluorine-removing material and an oxide of iron at a temperature between about 50 and about 550° F. and at a space velocity of about 1 to about 10 volumes of liquid per volume of iron oxide per hour under sufficient pressure to maintain the effluent in the liquid phase and removing said hydrocarbon conversion effluent free of said organic fluorine compounds and of said silicon tetrafluoride.

3. The process of claim 2 in which said oxide of iron is ferric oxide.

4. The process of claim 2 in which said oxide of iron is ferrous oxide.

5. The process of claim 2 in which said oxide of iron is a mixture of ferric oxide and ferrous oxide.

6. In a process for the alkylation of a low-boiling isoparaffin with a low-boiling olefin in the presence of a hydrofluoric acid alkylation catalyst wherein organic fluorine compounds are formed as by-products of said alkylation and contaminate a hydrocarbon alkylation effluent, the method for removing the organic fluorine compounds which comprises separating said hydrocarbon alkylation effluent into a liquid hydrocarbon-rich phase and a liquid hydrofluoric acid-rich phase, passing said hydrocarbon-rich phase containing dissolved hydrofluoric acid and a minor proportion of organic fluorine compounds to a fractional distillation, separating in said distillation a relatively low-boiling fraction comprising substantially all of the dissolved hydrofluoric acid and a relatively high-boiling fraction containing organic fluorine compounds, passing said high-boiling fraction through a treating zone for the removal of organic fluorine compounds from said high-boiling fraction, said treating zone comprising alternate bodies of silica-contaminated organic fluorine-removing material and iron oxide arranged in such a manner that the high-boiling fraction passing therethrough successively contacts said alternate bodies whereby the resulting silicon tetrafluoride formed in an amount equal to about 0.1 weight per cent upon contact with said organic fluorine-removing material is removed by said iron oxide, and removing from said treating zone a hydrocarbon effluent substantially free from fluorine compounds.

7. In a process involving the alkylation of isobutane with an olefin in the presence of a hydrofluoric acid alkylation catalyst in which a liquid hydrocarbon conversion effluent is contacted with bauxite containing a minor proportion of silica to remove organic fluorine compounds formed during said conversion and thereby is contaminated with water and with silicon tetrafluoride which is present in an amount less than 0.1 per cent by weight, and in which normal butane and heavier hydrocarbons are separated from isobutane and lighter hydrocarbons of a resulting hydrocarbon effluent in a first fractional distillation and isobutane is separated from propane and lighter hydrocarbons in a second fractional distillation under conditions such that said water is concentrated in the lighter fractions and said silicon tetrafluoride is hydrolyzed thereby to form siliceous deposits during condensation of at least one of the overhead fractions of said distillations, the method for preventing formation of such siliceous deposits which comprises contacting at least a portion of said overhead fractions from each of said distillations from which such deposits separate with an oxide of iron under conditions such that silicon tetrafluoride is removed by said iron oxide therefrom prior to the condensation of said fractions.

JAMES D. GIBSON.

REFERENCES CITED

The following references are of record in the file of this patent:

UNITED STATES PATENTS

| Number | Name | Date |
|---|---|---|
| 1,293,703 | Catlin | Feb. 11, 1919 |
| 2,347,945 | Frey | May 2, 1944 |
| 2,403,714 | Frey | July 9, 1946 |
| 2,409,372 | Matuszak | Oct. 15, 1946 |
| 2,413,868 | Frey | Jan. 7, 1947 |
| 2,430,453 | Cole | Nov. 11, 1947 |
| 2,430,460 | Frey | Nov. 11, 1947 |

OTHER REFERENCES

Mellor: "A Comprehensive Treatise on Inorganic and Theoretical Chemistry," vol. 6, page 939.

Martin: Anales fis. y quim. (Madrid), 41, 1303–16 (1945), cited in Chem. Abstracts, vol. 41, page 4404i.